United States Patent [19]

Espelage et al.

[11] 4,230,979
[45] Oct. 28, 1980

[54] CONTROLLED CURRENT INVERTER AND MOTOR CONTROL SYSTEM

[75] Inventors: Paul M. Espelage, Ballston Lake, N.Y.; Loren H. Walker, Salem, Va.; William G. Wright, deceased, late of Schenectady, N.Y., by Mary Nobel Wright, executrix

[73] Assignee: General Electric Company, Salem, Va.

[21] Appl. No.: 895,189

[22] Filed: Apr. 10, 1978

[51] Int. Cl.$^2$ .................... H02P 5/28; H02P 3/18; H02P 7/36
[52] U.S. Cl. .................... 318/721; 318/722; 318/723; 318/758; 318/759; 318/801; 318/802; 318/803
[58] Field of Search ............ 318/721, 722, 723, 758, 318/759, 799, 800, 801, 802, 803

[56] References Cited

U.S. PATENT DOCUMENTS

| | | | |
|---|---|---|---|
| 3,805,135 | 4/1974 | Blaschke | 318/803 |
| 3,919,609 | 11/1975 | Klautschek et al. | 318/803 |
| 4,044,285 | 8/1977 | Plunkett et al. | 318/803 |
| 4,088,935 | 5/1978 | D'Atre et al. | 318/802 |

*Primary Examiner*—J. V. Truhe
*Assistant Examiner*—Eugene S. Indyk
*Attorney, Agent, or Firm*—Arnold E. Renner

[57] ABSTRACT

A controlled current inverter system forms the basis of an a.c. motor drive system for furnishing the motor load with a variable frequency, variable magnitude a.c. current from an inverter which is supplied from a variable d.c. current source by way of a d.c. link including an inductor. Torque is the control parameter employed in the system and the motor speed and torque are controlled through the control of motor flux and motor current, by maintaining a controlled ratio between the direct and quadrature motor currents, through separate control paths to the d.c. source and the inverter. A third control path functioning on the difference between the desired and actual motor flux serves as a modifier to the main control paths to improve overall operation and control. Means associated with the basic control paths provide for dynamic braking of the motor.

25 Claims, 7 Drawing Figures

CONTROLLED CURRENT INVERTER AND MOTOR CONTROL SYSTEM

BACKGROUND OF THE INVENTION

The present invention relates generally to power conversion systems and more particularly to a system for controlling the torque of an a.c. (alternating current) motor, by controlling the torque of the motor through the control of the motor current, to maximize the motor efficiency through control of the motor flux, and to provide for dynamic braking of the motor.

Historically, d.c. (direct current) motors have been used where operation over a wide speed range is desired. More recently, a.c. motors have been finding greater application in variable speed drive applications. This is due in large part because of the inherent ruggedness of an a.c. motor plus a lesser maintenance problem due to the lack of brushes which make a.c. motors desirable for certain applications.

There are, however, certain problems associated with the use of a.c. motors particularly when the motor is supplied with power from a variable frequency inverter such as a phase controlled thyristor inverter. This is primarily the result of the fact that the commutation delay of the motor current may be as great as 120 degrees. In any phase controlled converter situation, a certain amount of time is expected between the time of rendering conductive (firing) one thyristor in the converter until the current will transfer from a previously conducting to the newly fired thyristor. Normally, this overlap of time is from 10 to 30 electrical degrees. In the case of an inverter situation supplying an a.c. motor such as an induction motor at high motor speed, it may take as long as 120 electrical degrees between the firing of a new thyristor and the transfer of the current to the motor phase to which the thyristor is connected. As such, the use of open loop systems in which the thyristors are fired as a result of a preestablished schedule is not particularly applicable to this type of operation and instead a closed loop system in which the thyristors of the inverter are fired as a function of the existing angle between air gap flux and stator current (hereinafter referred to as "air gap power factor") represents a more desirable mode of operation.

In addition, because the a.c. current supplied to the a.c. motor from a current source inverter is not sinusoidal, the motor tends to exhibit torque pulsations which can become particularly objectionable at low speeds. At higher speeds, these pulsations are absorbed by motor inertia but at lower speeds, as the inverter approaches zero frequency, the frequency of the torque pulsations can become low enough to excite mechanical resonances in the structure or to provide what is generally referred to as cogging in the motor performance.

SUMMARY OF THE INVENTION

It is, therefore, an object of the present invention to provide an improved power conversion system particularly as applied to the operation of an a.c. motor.

Another object is to provide an improved a.c. motor control and drive system.

A further object is to provide an improved a.c. motor control and drive system which operates at high efficiency.

It is an additional object to provide improved a.c. motor control and drive system in which torque ripple, particularly at lower operating speeds, is minimized.

It is a further object to provide an improved motor control and drive system which can operate at high speed where commutation (overlap) time approaches 120 electrical degrees.

It is still further object to provide an improved motor control and drive system including dynamic braking.

The foregoing and other objects are satisfied in accordance with the present invention through the provision of a controlled current inverter system for supplying an a.c. load, especially a motor, with an a.c. current of variable magnitude and frequency. The system employs a variable d.c. power source which is connected to a variable frequency inverter preferably by way of a d.c. link. Means are included to develop signals representing the instantaneous electrical torque of the a.c. motor and the instantaneous angle between the gap flux and the motor current. Through the establishment of a torque reference signal, the electric torque signal and the angle signal are utilized to provide appropriate error signals, the first serving to control the d.c. current in the link and the second to control the firing angle of the inverter with respect to the motor flux such that the air gap power factor at the motor is controlled. In a more preferred embodiment, a signal proportional to the gap flux of the motor is also generated and the difference between this signal and a reference proportional to the desired flux is utilized to provide modifying trim signals to each of the two main paths.

Dynamic braking of the motor is accomplished by providing a braking resistor which is normally short circuited but which is put into circuit when such braking is desired. When operating in the braking mode, the d.c. power source is effectively short circuited while the torque reference signal is variously adjusted to provide systemmatic braking of the motor.

BRIEF DESCRIPTION OF THE DRAWING

While the present invention is particularly defined in the claims annexed to and forming a part of this specification a better understanding can be had from the following description taken in conjunction with the accompanying drawings in which:

DETAILED DESCRIPTION

Figure 1:
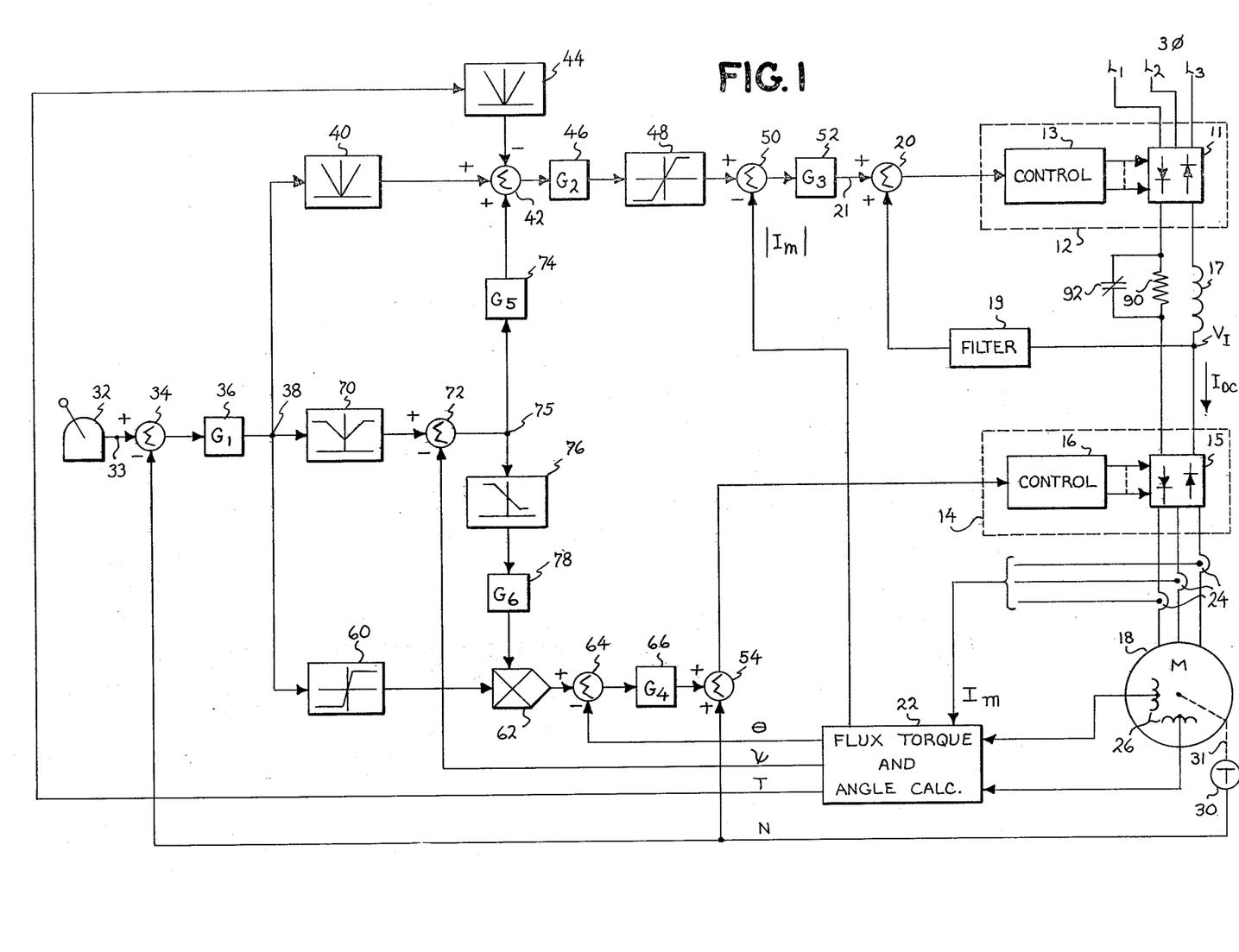
FIG. 1 is a schematic block diagram illustrating the present invention in its preferred embodiment.

Referring now to FIG. 1 which shows the present invention in its preferred embodiment, it is seen that the more fundamental aspect of the present invention centers around the controlled current inverter system. The system includes a source of variable d.c. current 12 which, in FIG. 1, is shown as a converter unit 11 under the control of a suitable control means 13. A current ($I_{DC}$) is supplied from the source 12 by way of a d.c. link circuit, including a suitable filter for smoothing the d.c. current from the source 12 such as an inductor 17, to a suitable inverter circuit 14 including a converter unit 15 under the control of a control means 16. The output of the inverter circuit 14 is supplied to a load shown in FIG. 1 as a motor 18. The d.c. link circuit also includes a dynamic braking resistor 90 which is connected in parallel with a normally closed shorting contact 92. The dynamic braking mode of operation of the instant invention will be discussed later in this specification, particularly with respect to FIG. 5, and for the present contact 92 may be considered in its normal closed position such that resistor 90 is effectively absent from the circuit.

The d.c. source 12 could be any one of a variety of forms such as, for example, a d.c. chopper whose input terminals are coupled to an uncontrolled d.c. source. In such a case the control could be of the time ratio type. The source 12 could also include some other means for varying the current emanating from a d.c. source. More commonly, however, the source 12 would be of the form illustrated in FIG. 1 in which the conversion unit is a phase controlled multi-legged bridge, for example a 6-thyristor bridge, which has its input connected to a three phase source as represented by terminals $L_1$, $L_2$ and $L_3$. In this situation, the control could be of that known type which is synchronized with the line voltage and which, under the control of an input signal, varies the output by varying the firing angles of the bridge rectifiers in response to an input signal to thereby vary the source output.

A feedback path from the inverter input voltage ($V_I$) is provided to the d.c. source by way of a filter 19 and a summing junction 20. This is a positive feedback of unity gain. Ignoring for the moment any other inputs to summing junction 20, this feedback will cause the output voltage of unit 11 to match that ($V_I$) reflected by the inverter 14. With no d.c. voltage across inductor 17, the inductor will tend to maintain a constant current at any voltage level set by $V_I$. If a second signal is injected into summing junction 20; i.e. at terminal 21, this will tend to cause a voltage across inductor 17 which is proportional to this second signal. This will cause a rate-of-change of current ($I_{DC}$) in inductor 17 which is proportional to the signal at terminal 21. Thus, the positive feedback signal through filter 19 has tended to convert d.c. voltage source 12 into a d.c. current source responsive to input at terminal 21; that is, as shown in FIG. 1, the output of an amplifier 52 will be later described.

The inverter circuit 14 includes a suitable conversion unit 15 which may also take any suitable form but which most commonly today would also be a 6-thyristor bridge as known in the art. The operating frequency of the unit 15 is shown under the control of a control means 16. One well-known implementation for the control means would include a voltage controlled oscillator feeding a ring counter the output signals of which are used to initiate the firing of the thyristors of the bridge. In this well-known type of control, the magnitude to the input signal to the voltage controlled oscillator controls the inverter output frequency. As is understood, the instantaneous air gap power factor at the motor load can be varied by changing the inverter output frequency since any difference between the frequency of motor back EMF (flux) and the frequency of inverter current will appear as a rate of change of phase angle of current with respect to flux.

Motor 18 is, as was earlier indicated, an a.c. motor, preferably an a.c. induction motor. As such, as is well known in the art, the motor will have a stator and a rotor which is separated from the stator by a gap across which flux is developed.

In the overall control of the present invention, four signals find primary application. These signals are, respectively, proportional to the gap flux ($\Psi$), the electrical torque (T), the angle between the motor flux and the motor current ($\theta$) and the actual motor speed (N). The three signals $\Psi$, T and $\theta$ are derived by suitable calculations in response to motor operating parameters and are shown emanating from block 22 in FIG. 1. The exact circuitry of the block 22 is not of critical importance to the present invention but it may, for example, be that which is shown and described in U.S. Pat. No. 4,088,934, issued May 9, 1978 by J. D. D'Atre, A. B. Plunkett and T. A. Lipo, entitled, "Means For Stabilizing A-C. Electric Motor Drive System" which patent is assigned to the assignee of the present invention and which patent is specifically incorporated hereinto by reference. In accordance with the description in the aforementioned patent, the block 22 develops the $\Psi$, T and $\theta$ signals as a function of inputs representing motor parameters including the motor current ($I_M$) which is shown in FIG. 1 as being derived from three current sensors 24 associated with the lines connecting the inverter and the motor 18. The other inputs to block 22 are signals proportional to motor flux which are shown as being derived from a pair of flux coils 26 associated with the motor. As illustrated in FIG. 1, in addition to the $\Psi$, T and $\theta$ signals, block 22 outputs a signal ($|I_m|$) proportional to the absolute motor current. This signal represents nothing more than the absolute value of the rectified and combined individual values of the signals derived from the three current sensors 24.

A tachometer 30 is shown associated with the motor 18 as indicated by the dashed line 31 and serves as an exemplary means of providing the fourth or motor speed signal (N). Tachometer 30 could be any of those well known in the art, for example, a d.c. tachometer which will provide a steady-state output voltage signal proportional to the actual speed of the motor.

The basic control function of the present invention has its origin with the establishment of a torque reference signal. To establish this signal in accordance with the illustration in FIG. 1, there is shown a suitable means such as an operator settable rheostat 32 which will output a signal to a point 33 which is porportional to a desired motor speed; i.e., a speed reference signal. The speed signal N from the tachometer 30 is combined with the speed reference signal from the device 32 in a summing junction 34 such that the output of junction 34 will be a signal proportional to the difference between the desired and the actual motor speed. This difference signal is applied to a suitable amplifier 36 having a transfer function appropriate for speed regulation. Customarily this transfer function is of an integration type such as that, for example, expressed by the equation:

$$G_1 = [K(1+St)]/S,$$

wherein K is a constant, t is a time contant and S is the Laplace transform operator. The output of amplifier 36 at point 38 is a signal which is designated the torque reference signal. That this actually is a signal proportional to a desired change in torque is readily apparent when one considers that, if the speed of the motor differs from that which is desired, to get to the desired speed a change in torque will be required.

It will be remembered from the previous discussion that the purpose of the direct current source 12 was to provide a d.c. current of varying magnitude in accordance with the desired torque. The top channel will, therefore, be discussed first. Since the present invention contemplates motor operation in both the forward and reverse directions, and since in either case the torque reference signal at point 38 could be of either relative polarity, this signal is first applied to an absolute magnitude circuit 40, the output of which forms one input to a summing junction 42. A second input to junction 42 is the output of a second absolute magnitude circuit 44 which has as its input the signal (T) proportional to the instantaneous torque such that, ignoring for the present the third input to the summing junction 42, the output of junction 42 as applied to a suitable amplifier 46 is a signal proportional to the difference between the torque reference signal and the actual instantaneous torque. The output of amplifier 46 is applied to a limiting circuit or limiter 48 which serves to prevent exceptionally large excursions from occurring in short periods of time and thus limits the rates of which change can be effected. The output of limiter 48 is applied by way of a summing junction 50 which has as a second input a signal proportional to the absolute magnitude of the motor current ($|I_M|$) from block 22. This particular feedback of the $|I_M|$ signal, shown only for purposes of completeness in the overall system, serves as a small negative feedback in a stabilizing direction so that when a large torque is called for, the torque error may be satisfied transiently by a large current rather than a large torque until the actual torque can build up. As such, the output from the summing junction 50 is supplied to a suitable amplifier 52 the output of which serves as an input to terminal 21 of the summing junction 20 previously discussed. Since, as previously indicated, the feedback ($V_f$) from the inverter voltage by way of the filter 19 causes the current $I_{DC}$ to be controlled by the signal at terminal 21, errors in torque will be corrected through the upper channel path to the control 13 such that when more torque is required a positive voltage will be passed to the control 13 to effect more current from the source 12. Conversely, when less torque is required, a negative or less positive signal will be applied to the control 13 thus decreasing the amount of current supplied from the source to the inverter 14.

The next path to be discussed is the lower control path on the diagram of FIG. 1. This is the path which controls the frequency of inverter operation and hence the air gap power factor. Looking at this lower path, it is first seen that the speed signal N, from tachometer 30, forms a positive feedback which is analogous to the feedback for the d.c. link voltage to the source 12 by way of the filter 19. That is, the tachometer feeds back a d.c. signal in a positive sense which commands the inverter frequency to remain at the zero slip value. As such, the rest of the lower channel has only to handle signals proportional to slip frequency.

Figure 2:
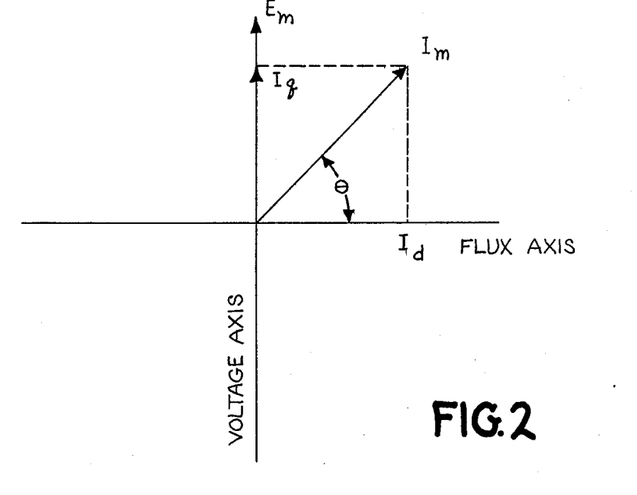
FIGS. 2, 3 and 4a through 4c are graph wave forms helpful in understanding the operation of the present invention.

It was earlier indicated that the inverter 14 is controlled to provide a specified air gap power factor. This power factor may be defined by an angle $\theta$ and before continuing with the discussion of the lower control channel, therefore, it is believed desirable to define what is meant by the angle $\theta$. Referring to the graph of FIG. 2, the abscissa is labeled the flux axis and the ordinate the voltage axis. The induced motor voltage is shown as $E_M$. Also shown is the motor current $I_M$ which may be considered as two components, a direct portion $I_d$ which is in phase with the flux and a quadrature current $I_q$ which is 90 degrees leading the current $I_d$. As is well known in the motor art, the current $I_q$ is the one which produces torque or power while the reactive component of the motor current, $I_d$, is that which produces flux. As such, for any particular motor there is a definable relationship between $I_q$ and $I_d$ which will provide the optimum operation of the motor from a current utilization standpoint. This relationship may also be defined by the angle $\theta$ between $I_M$ and $I_d$ and if, for a particular motor, this angle is held constant, the motor will run at a constant power factor any time that it is loaded. Thus, the power factor can be optimized for the motor.

With the foregoing in mind, beginning again at point 38 the torque reference signal is applied to a suitable limiting circuit or limiter 60 which provides, essentially, an output signal of constant magnitude but of varying polarity in accordance with the polarity of the torque reference signal. This output of the limiter 60, an angle reference signal proportional to the desired value of $\theta$, is applied to a multiplier 62 which for the moment may be considered as having a second input of unity such that its output is an exact duplicate of its input. The output of the multiplier 62 is applied as one input to a summing junction 64 the other input to which is the angle signal $\theta$ from the block 22. These two signals, the angle reference signal from block 60 and the angle signal from block 22 form a frequency error signal which is applied by way of a suitable amplifier 66 to the summing junction 54. As previously discussed, the output of junction 54 is a frequency command signal which is applied to the control 16 to thereby control the frequency of the output of the inverter 14. (It is noted, referencing block 60, that if the torque reference is zero the angle reference signal from the angle program 60 is also zero. This is the no load condition at which the power factor can only be zero and, therefore, angle $\theta$ must be zero as well). From the preceding, the lower loop is essentially a phase-locked loop which senses an angle error to control the frequency and hence the air gap power factor of the motor.

From the description thus far it is seen that by holding the air gap power factor of the motor constant (bottom channel) and controlling the instantaneous current through the top channel, a precise and instantaneous control of both torque and flux in the motor is maintained. It is noted, however, that this precise control can only be obtained if the motor characteristics are very constant, linear, and are accurately known such that the angle $\theta$ can be calculated very precisely. Since this is not ordinarily the case, the present invention provides a third control loop. This third loop employs the $\Psi$ signal from block 22 and functions as a low gain trim to provide modifications to both the current control and frequency control paths to assure that the motor flux is at the proper value for each torque level.

Figure 3:
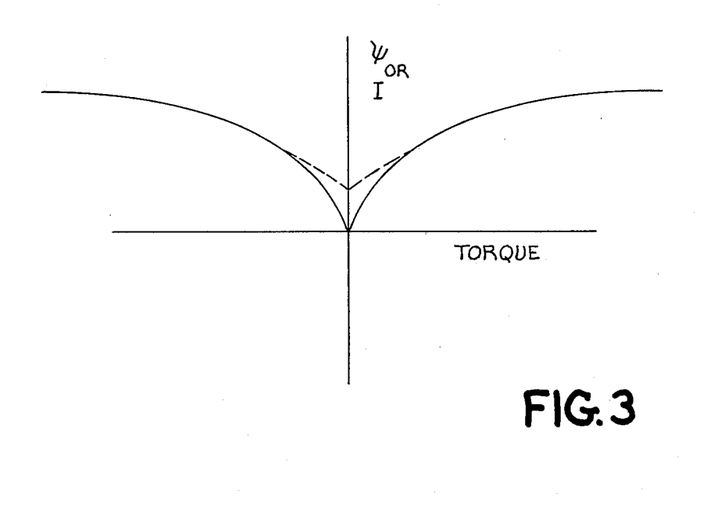

Prior to the discussion of this third path, however, an understanding of the representation of FIG. 3 is believed advantageous. In FIG. 3 there is shown the well-known characteristic in which current or flux is plotted as a function of torque. As is seen from the solid-line depiction of FIG. 3, when the motor is operated at constant angle (or constant slip) the current or flux is proportional to the square root of the torque. The characteristic thus takes on the typical parabolic shape shown. As will become evident as the description proceeds, however, it is not desirable to ever allow the flux to go to zero in order to keep the angle loop active at no load and to be ready to deliver torque quickly if called upon. To this end, a desirable characteristic is that which is shown in FIG. 3 by the dashed lines which modify the basic parabolic function for both forward and reverse directions.

Returning again to FIG. 1, block 70 represents a flux program which receives as its input the torque reference signal at point 38. The similarity between the depicted function of block 70 and the dashed line graph of FIG. 3 is noted and it is seen that this may be achieved by a simple magnitude limited absolute value circuit having an offset such that the output of the block 70 always has some finite value even though the signal at point 38 goes to zero. The output from block 70, a flux reference signal, is supplied as one input to a summing junction 72 the other input of which is the $\Psi$ signal (from block 22) which has a magnitude proportional to the instantaneos value of the motor gap flux. The output from the summing junction 72 is here termed a flux error signal and appears at junction 75. The output from summing junction 72 is applied by way of a suitable amplifier 74 to the summing junction 42 in a positive sense. This positive addition to the torque control channel has the effect that if the instantaneous flux is less than that desired, the addition at summing junction 42 will result in an increase in current to the inverter 14. Conversely if the flux is higher than desired, a smaller current will be supplied to the inverter.

The output of the summing junction 72 is also provided to a simple limiter 76 which is provided with an offset so that with a zero value of the flux error signal at junction 75 the output of the function 76, after being applied through a suitable gain amplifier 78 the output of which serves as an input to the multiplier 62 previously mentioned, is unity. Other values of the flux error signal will result in a multiplication factor of greater or less than unity but always greater than zero being applied to the multiplier 62. The effect of this flux error signal on the angle command is to reduce angle when more flux is needed.

The overall effect of the middle or flux loop as a modifier to the other two loops is essentially as follows. When there is no flux error, there is no effect from the flux loop on the multiplier 62 and, hence, the output of this multiplier is a function of its quiescent gain. When there is a flux error, the path including the limiter 76 and amplifier 78 serves to change the gain of the multiplier 62 to correct that error. At very light motor loads the output of summing junction 50 in the torque regulation loop (upper loop) might be insufficient to maintain predictable control of the flux and the feedback path for the flux error by way of amplifier 74 serves to control this flux level at these light loads by the current control previously mentioned. Thus, when the motor is unloaded, the motor slip and angle $\theta$ are both near zero. The flux control path through limiter 76 and amplifier 78 which acts on motor frequency (angle $\theta$) cannot control flux. The path of the flux error signal by way of amplifier 74 can act to control flux by controlling motor current at no load. In the heavily loaded condition by making the gain of amplifier 74 low, its output will be small compared to the torque signals through blocks 40 and 44 so that the flux loop will have little effect on current. Thus, when the motor is loaded the flux error is kept small by the action of path through multiplier 62 and the path by way of amplifier 74 has little effect. When the motor load is light and the flux cannot be controlled through the frequency, the flux error becomes large enough for response through the summing junction 42 in the torque regulation path.

Figure 4A:
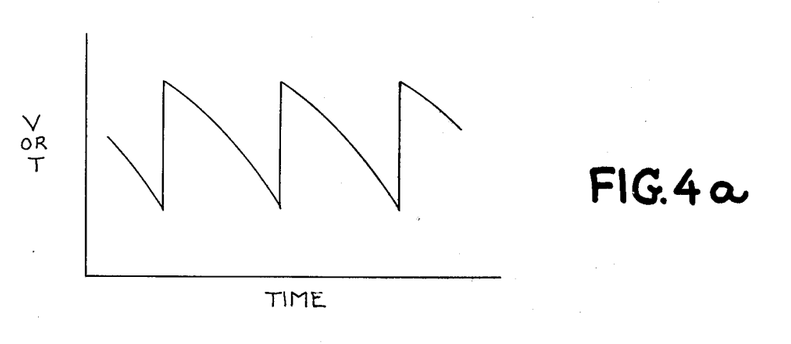
Figure 4B:
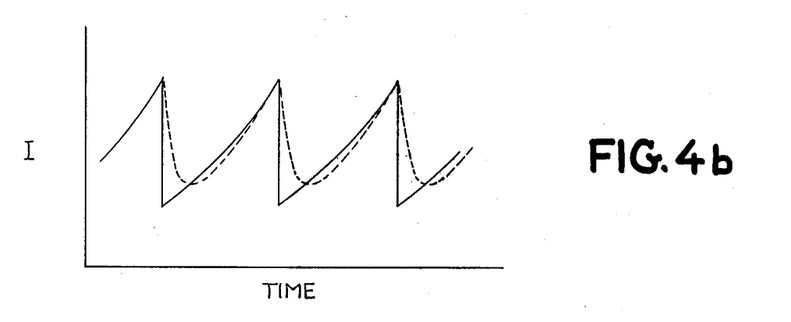
Figure 4C:
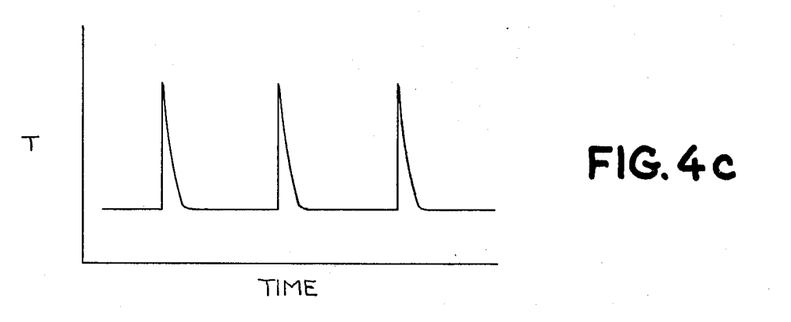

It was earlier mentioned that torque pulsations tend to be a problem in the type of motor drive here being discussed and that these pulsations can become particularly bothersome at low operating speeds. One way to understand the cause of the torque pulsations is to consider the power flow through the inverter and motor. If it is assumed, as may be reasonably done, that the power coming from the shaft of the motor is instantaneously equal to the power that is applied to the inverter, then it is seen that the shaft power at the motor output is approximately equal to the product of the d.c. current ($I_{DC}$) and the inverter reflected voltage $V_I$. This conclusion is based upon the assumption that the shaft speed does not significantly change such that the shaft torque represents the shaft power. It also assumes that there is no stored energy in either the inverter or the motor. Based upon these assumptions it is apparent that, because of the nature of the inverter, there will be a voltage ripple which occurs at the input of the inverter which will be seen as a torque ripple at the shaft output. This ripple is illustrated in FIG. 4a. If FIG. 4a represents the voltage at the inverter input and the d.c. current $I_{DC}$ is steady-state, then it is apparent that there will be torque ripple at the motor shaft output which is also represented by FIG. 4a. It is an established fact that little can be done to control the inverter voltage to remove the ripple. The same, however, does not necessarily hold true for the current. As such, if the current were to have the appearance shown in FIG. 4b by the solid line; that is, a waveshape which is essentially the inverse of the depiction of FIG. 4a, then it is readily apparent that the power input to the inverter and hence the torque output of the motor would be a steady-state. As a practical matter, the idealized current form shown by this solid line of FIG. 4b is not easily achieved short of a very elaborate anticipatory program. The control of FIG. 1 is a reaction type control and will not, therefore, produce the solid line waveshape of FIG. 4b. It will, however, because of the parameters sensed and in accordance with the earlier description produce a current waveshape similar to that shown by the dashed line in FIG. 4b. If then the dotted line representing current of FIG. 4b is multiplied by the depiction of FIG. 4a, the result representing the instantaneous torque output of the motor will be something which can be represented basically by that shown in FIG. 4c. That is, the torque would be substantially constant but with small, sharp peaks. These peaks are in no way desirable and are less than the ideal but the FIG. 4c depiction does represent a considerable improvement over the torque representation as shown in FIG. 4a. The present invention, as represented by the preferred embodiment showing of FIG. 1 achieves this result.

Thus, it is seen from the description thus far that there has been provided a power conversion scheme particularly adapted for motor control which is economically feasible and which provides precise control of instantaneous torque for fast dynamic response and for reduction of torque pulsations particularly at low speed.

Figure 5:
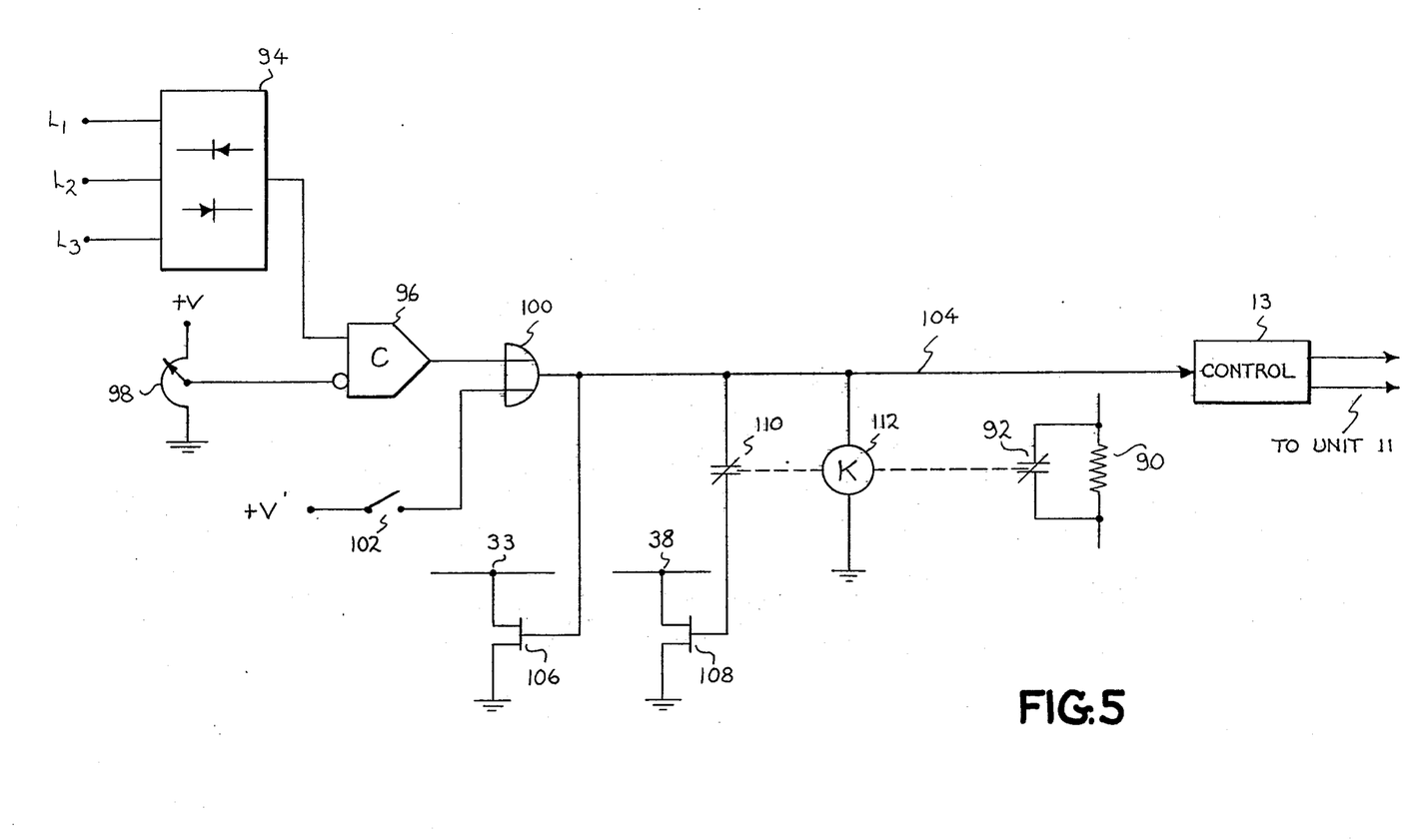
FIG. 5 is a schematic functional diagram illustrating the dynamic braking feature of the present invention.

Previous mention was made of the dynamic braking mode of operation which also forms a feature of the present invention. It will be remembered that, in the early part of the description regarding FIG. 1, a resistor 90 having a shortcircuiting contactor 92 was provided in the d.c. link circuit connecting the source 12 with the inverter 14. FIG. 5 taken in conjunction with FIG. 1 illustrates how the resistor is employed, in conjunction with the control of FIG. 1 to effect the braking mode of operation in the overall invention.

Referencing now FIG. 5, the three phase source, again represented by terminals $L_1$, $L_2$ and $L_3$ is shown connected to a signal level rectifier 94 such that the output of the rectifier is a signal having level proportional to the source voltage. This signal is applied as one input to a simple voltage comparator 96, for example an operational amplifier connected in the voltage comparison mode. The second input to the comparator 96 is shown as being derived from the wiper arm of a potentiometer 98 which is connected between a source of positive potential (+V) and ground. Potentiometer 98 represents any suitable means for developing a signal representing a safe operational level of the motor drive of FIG. 1. This level may be, for example, at seventy percent of the normal voltage at terminals $L_1$, $L_2$ and $L_3$. As such, in the embodiment illustrated, comparator 96 will provide a high level signal only when the voltage from potentiometer 96 exceeds that from the rectifier 94.

The output from comparator 96 forms one input to an OR function circuit represented by gate 100 which has a second input connected to an additional source of positive potential (+V′) by way of a switch 102. This portion of the depiction is included solely for purposes of illustrating a complete typical system and as such switch 102 represents a command source for an "emergency stop". Thus, when either comparator 96 is outputting a high level signal or when switch 102 is closed, gate 100 will present a high level signal on a bus 104 which signal, herein designated a "braking signal", specifies that the system of FIG. 1 will enter into the dynamic braking mode of operation.

As shown in FIG. 5, the braking signal on bus 104 is simultaneously applied to several channels to effect various operations. Firstly, this braking signal acts to force the speed reference signal (point 33 of FIGS. 1 and 5) to a value specifying zero speed. In FIG. 5 this is illustrated by the connection of point 33 to ground by way of a suitable switching means shown as a field effect transistor (FET) 106. If FET 106 is in the enhancement mode, the application of the positive braking signal to its base will place the FET into conduction and thus pull point 33 to ground potential. A second application of the braking signal on bus 104 is to the control 13 of the d.c. source 12. Control 13 is so constructed and arranged that the receipt of a positive signal by way of bus 104 will result in the short circuiting of the output of unit 11. The manner in which this short circuiting occurs will, of course, depend upon the nature of unit 11 and the means provided but if, as an example, the unit were a phase controlled multi-legged thyristor bridge as suggested in the preferred embodiment, short circuiting could be achieved by simultaneously firing all thyristors in a leg.

The third application of the braking signal on bus 104 is to the base of an additional switch, shown as a FET 108, by way of a normally closed contactor 110. The source-drain circuit of FET 108 connects point 38 (FIG. 1) to a value representing a demand for zero torque (e.g., ground) in the same manner as FET 106 connects point 33 to ground.

The last employment of the signal on bus 104 is to operate the contacts 92 and 110. This is symbolically illustrated in FIG. 5 by the application of this signal to a coil 112 such that the coil is energized to effect the opening of the two contacts 110 and 92, thus removing the forced zero torque reference signal and inserting the resistor 90 into the d.c. link circuit (FIG. 1).

The operation of the FIG. 5 showing is believed apparent from the preceding but may be briefly summarized as follows. When dynamic braking is desired, the braking signal is placed on bus 104 which immediately effects the forcing of the speed and torque reference signals to levels representing zero demand and the d.c. source is short circuited. The reaction time of coil 112 presents a slight delay and after that delay the braking resistor is placed in circuit while, simultaneously, the torque reference signal, by virtue of the opening of contact 110 is allowed to assume a new value as a function of the forced zero speed reference signal and the extant values of the speed signal N (that is, as a function of the output of summing junction 34 of FIG. 1) and the motor is brought to a controlled stop under the full control of the flux ($\Psi$) and angle ($\theta$) loops.

Thus, it is seen that the system of the present invention provides not only for the control earlier described but also for orderly entry into a dynamic braking mode of operation.

While there have been shown and described what is at present considered to be the preferred embodiment of the present invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed is:

1. A control for an a.c. electric motor having a stator and a rotor spaced from the stator by a gap across which gap flux is produced in response to an electrical motor current of variable magnitude and frequency through windings associated with said stator, said control serving to control the electrical torque of said motor and comprising:
    (a) means to determine, with respect to the motor, the instantaneous electrical torque and the instantaneous angle between the gap flux and the motor current and to provide signals proportional thereto;
    (b) means to establish a torque reference signal proportional to a desired level of electrical torque;
    (c) means to compare said torque reference signal with said signal proportional to the instantaneous electrical torque and to generate a current error signal representative of any difference therebetween, said current error signal acting as the primary control parameter serving to vary the magnitude of the motor current;
    (d) means responsive substantially solely to said torque reference signal to derive an angle reference signal representative of the desired angle between the gap flux and the motor current; and,
    (e) means to compare said angle reference signal with said signal proportional to the instantaneous angle between the gap flux and motor current and to generate a frequency error signal representative of any difference therebetween and effective to vary the frequency of the motor current.

2. The invention in accordance with claim 1 further including:
    (a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) means to modify the value of said angle reference signal as a function of said flux error signal.

3. The invention in accordance with claim 1 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) means to modify the value of said torque reference signal as a function of said flux error signal.

4. The invention in accordance with claim 1 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, first and second modifying means each responsive to said flux error signal to modify, respectively, the values of said angle reference signal and said torque reference signal.

5. The invention in accordance with claim 2 wherein said last recited means includes:

(a) amplifying means, responsive to said flux error signal, to provide an output signal having a maximum value and a minimum value not less than zero; and, (b) multiplying means responsive to the output of said amplifying means effective to modify the value of said angle reference signal.

6. The invention in accordance with claim 4 wherein said first modifying means includes:

(a) amplifying means, responsive to said flux error signal, to provide an output signal having a maximum value and a minimum value not less than zero; and, (b) multiplying means responsive to the output of said amplifying means effective to modify the value of said angle reference signal.

7. The invention in accordance with claim 1 wherein said means to establish a torque reference signal includes:

(a) means to generate a speed reference signal proportional to a desired motor rotational speed;

(b) means to generate an actual speed signal proportional to the actual rotational speed of the motor; and, (c) means to determine the difference between the speed reference and the actual speed signals, said difference being proportional to said torque reference signal.

8. The invention in accordance with claim 1 further including:

(a) means to produce an actual speed signal proportional to the instantaneous rotational speed of the motor; and wherein (b) means are included to combine said actual speed signal with the results of the comparison of the angle reference signal and the signal proportional to the instantaneous angle between the gap flux and the motor current to produce said frequency error signal.

9. The invention in accordance with claim 1 further including:

(a) means to provide a modifying signal proportional to the absolute magnitude of the motor current, said modifying signal being low in value as compared to said current error signal; and, (b) means to modify the current error signal as a function of said modifying signal.

10. An a.c. motor drive for use with an a.c. motor having a stator and a rotor spaced from the stator by a gap across which gap flux is produced in response to electrical motor current supplied to said motor comprising:

(a) a variable d.c. current source for providing a d.c. output current which varies in response to a current error input signal;

(b) a source of variable frequency current for supplying current to said motor at a frequency which is a function of a frequency error signal;

(c) link circuit means including an inductor for connecting said d.c. current source to said source of variable frequency current;

(d) means to determine, with respect to the motor, the instantaneous electrical torque and the instantaneous angle between the gap flux and the motor current and to provide signals proportional thereto;

(e) means to establish a torque reference signal proportional to a desired level of electrical torque;

(f) means to compare said torque reference signal with said signal proportional to the instantaneous electrical torque and to generate a current error signal representative of any difference therebetween, said current error signal acting as the primary control parameter serving to vary the magnitude of the motor current;

(g) means responsive substantially solely to said torque reference signal to derive an angle reference signal representative of the desired angle between the gap fluz and the motor current; and, (h) means to compare said angle reference signal with said signal proportional to the instantaneous angle between the gap flux and motor current and to generate a frequency error signal representative of any difference therebetween and effective to vary the frequency of the motor current.

11. The invention in accordance with claim 10 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) means to modify the value of said angle reference signal as a function of said flux error signal.

12. The invention in accordance with claim 10 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) means to modify the value of said torque reference signal as a function of said flux error signal.

13. The invention in accordance with claim 10 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) first and second modifying means each responsive to said flux error signal to modify, respectively, the values of said angle reference signal and said torque reference signal.

14. The invention in accordance with claim 11 wherein said last recited means includes:

(a) amplifying means, responsive to said flux error signal, to provide an output signal having a maximum value and a minimum value not less than zero; and, (b) multiplying means responsive to the output of said amplifying means effective to modify the value of said angle reference signal.

15. The invention in accordance with claim 13 wherein said first modifying means includes:

(a) amplifying means, responsive to said flux error signal, to provide an output signal having a maximum value and a minimum value not less than zero; and, (b) multiplying means responsive to the output of said amplifying means effective to modify the value of said angle reference signal.

16. The invention in accordance with claim 10 wherein said means to establish a torque reference signal includes:

(a) means to generate a speed reference signal proportional to a desired motor rotational speed;

(b) means to generate an actual speed signal proportional to the actual rotational speed of the motor; and, (c) means to determine the difference between the speed reference and the actual speed signals, said difference being proportional to said torque reference signal.

17. The invention in accordance with claim 10 further including:

(a) means to produce an actual speed signal proportional to the instantaneous rotational speed of the motor; and wherein (b) means are included to combine said actual speed signal with the results of the comparison of the angle reference signal and the signal proportional to the instantaneous angle between the gap flux and the motor current to produce said frequency error signal.

18. The invention in accordance with claim 10 further including:

(a) means to provide a modifying signal proportional to the absolute magnitude of the motor current, said modifying signal being low in value as compared to said current error signal; and, (b) means to modify the current error signal as a function of said modifying signal.

19. The invention in accordance with claim 10 wherein said variable d.c. current source comprises a variable d.c. voltage source and a positive feedback path for providing a positive feedback signal proportional to the voltage of the source of variable frequency current to thereby make the quiescent values of the voltages of the two sources equal.

20. The invention in accordance with claim 16 wherein said link circuit means further includes a dynamic braking resistor and an associated switch means normally operative to render said resistor ineffective with respect to said link circuit and wherein said drive further includes means to effect a dynamic braking operation including:

(a) means to generate a braking signal designating a braking operation;

(b) first, second and third means responsive to said braking signal and substantially simultaneously operative to respectively, (1) short circuit said d.c. current source, (2) force said speed reference signal to a value representing zero speed, and (3) force said torque reference signal to a value representing zero torque; and, (c) fourth means responsive to said braking signal effective subsequently to said first, second and third means to, (1) operate the switch means associated with said braking resistor to thereby render said resistor effective with respect to said link circuit, and (2) substantially simultaneously render said third means ineffective.

21. The invention in accordance with claim 20 further including:

(a) means to determine, with respect to the motor, the instantaneous gap flux and to provide a signal proportional thereto;

(b) means responsive to said torque reference signal to produce a flux reference signal proportional to a desired gap flux;

(c) means to compare said flux reference signal with said signal proportional to the instantaneous gap flux and to produce a flux error signal representative of any difference therebetween; and, (d) means to modify the value of said angle reference signal as a function of said flux error signal.

22. The invention in accordance with claim 21 wherein said means to modify the value of the angle reference signal as a function of said flux error signal includes:

(a) amplifying means, responsive to said flux error signal to provide an output signal having a maximum value and a minimum value not less than zero; and, (b) multiplying means responsive to the output of said amplifying means effective to modify the value of said angle reference signal.

23. In a control for an a.c. induction electric motor having a stator and a rotor spaced from the stator by a gap across which gap flux is produced in response to an electrical motor current of variable magnitude and frequency through windings associated with said stator, said control including first and second electrical power converters and a direct current link connected to, and intermediate, said converters, said control further including means associated with said first converter to control the electrical current in said direct current link, and means associated with said second converter to control the frequency of the electrical motor current, means to effect a dynamic braking mode of motor operation comprising:

(a) command means operative to generate a braking signal to initiate said mode of dynamic braking;

(b) shorting means responsive to said braking signal to short circuit said direct current link at the connection of said link with said first power converter whereby said motor is isolated from said first power converter;

(c) resistive means associated with said direct current link;

(d) switch means responsive to said braking signal to selectively include said resistive means in said direct current link when the dynamic braking mode of motor operation is desired; and, (e) frequency control means responsive to said braking signal to control frequency of operation of said second electrical power converter to thereby control said motor.

24. The invention in accordance with claim 23 wherein said frequency control means comprises:

(a) means to determine, with respect to the motor, the magnitude of the instantaneous gap flux and to provide a signal proportional thereto;

(b) means to produce a flux reference signal proportional to a desired gap flux;

(c) means to compare said flux reference signal with said signal proportional to the instantaneous gap flux and to produce a flux error signal representative of any difference therebetween; and, (d) means to establish the frequency of operation of said second electrical power converter as a function of said flux error signal to thereby maintain desired gap flux.

25. The invention in accordance with claim 24 wherein said means to establish the frequency comprises:

(a) means to determine the actual angle between the gap flux and motor current and to provide an angle signal as a function thereof;

(b) means to establish a reference value of the desired angle between gap flux and motor current;

(c) means to modify said reference value as a function of said flux error signal to provide an angle command signal indicative of a value of the angle between the gap flux and the motor current required to correct for said flux error; and, (d) comparator means for comparing said angle command signal and said angle signal to generate a frequency error signal operative to vary the frequency of operation of said second electrical power converter.

* * * * *